(12) United States Patent
Raszuk et al.

(10) Patent No.: US 8,077,607 B2
(45) Date of Patent: Dec. 13, 2011

(54) DYNAMIC RESPONSE TO TRAFFIC BURSTS IN A COMPUTER NETWORK

(75) Inventors: Robert Raszuk, Komorow (PL); Stefano B. Previdi, Rome (IT); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 11/685,837

(22) Filed: Mar. 14, 2007

(65) Prior Publication Data

US 2008/0225711 A1    Sep. 18, 2008

(51) Int. Cl.
    *H04J 1/16*    (2006.01)
(52) U.S. Cl. ......................................................... 370/229
(58) Field of Classification Search .................. None
    See application file for complete search history.

(56) References Cited

U.S. PATENT DOCUMENTS

| | | | |
|---|---|---|---|
| 5,381,407 A * | 1/1995 | Chao | 370/233 |
| 5,550,829 A * | 8/1996 | Wang | 370/311 |
| 6,072,773 A | 6/2000 | Fichou et al. | |
| 6,144,637 A | 11/2000 | Calvignac et al. | |
| 6,175,570 B1 | 1/2001 | Cukier et al. | |
| 6,320,845 B1 | 11/2001 | Davie | |
| 6,424,624 B1 | 7/2002 | Garland et al. | |
| 6,483,805 B1 * | 11/2002 | Davies et al. | 370/235 |
| 6,570,847 B1 * | 5/2003 | Hosein | 370/230.1 |
| 6,690,645 B1 * | 2/2004 | Aweya et al. | 370/230 |
| 6,778,498 B2 * | 8/2004 | McDysan | 370/231 |
| 6,904,014 B1 | 6/2005 | Gai et al. | |
| 6,920,111 B1 | 7/2005 | Zhang et al. | |
| 7,006,440 B2 * | 2/2006 | Agrawal et al. | 370/235 |
| 7,012,891 B1 | 3/2006 | Chandran et al. | |
| 7,061,860 B1 | 6/2006 | Calvignac et al. | |
| 7,126,913 B1 | 10/2006 | Patel et al. | |
| 7,149,187 B1 | 12/2006 | Jacobson et al. | |
| 7,184,397 B1 | 2/2007 | Wilkie et al. | |
| 7,187,681 B1 | 3/2007 | O'Toole, Jr. et al. | |
| 7,392,279 B1 * | 6/2008 | Chandran et al. | 709/200 |
| 7,564,852 B2 * | 7/2009 | Das et al. | 370/395.41 |
| 2002/0093910 A1 * | 7/2002 | Yazaki et al. | 370/229 |
| 2003/0038981 A1 * | 2/2003 | Trachtman | 358/407 |
| 2003/0179774 A1 * | 9/2003 | Saidi et al. | 370/468 |
| 2003/0236827 A1 | 12/2003 | Patel et al. | |

(Continued)

OTHER PUBLICATIONS

Alberto Leon-Garcia and Indra Widjaja, Communication Networks: Fundamental Concepts and Key Architectures (2004) Published by McGraw-Hill, Second Ed., pp. 17-18, 549-561, 576-578, 599, 666-673, 686-688, 706-707, 719-720, 727-729.*

*Primary Examiner* — Kwang B Yao
*Assistant Examiner* — Juvena Loo
(74) *Attorney, Agent, or Firm* — Cesari and McKenna, LLP (57) ABSTRACT

In one embodiment, a node receives traffic sent from one or more sources toward one or more destinations (e.g., Multi-point-to-Point, MP2P traffic). The node may detect a burst of received traffic based on one or more characteristics of the burst traffic, and, in response, may dynamically apply traffic shaping to the burst traffic. The traffic shaping is adapted to forward burst traffic received below a configurable threshold at a configurable pace and to drop burst traffic received above the configurable threshold. In addition, the node may also store the burst traffic dropped by traffic shaping, and forwards the stored burst traffic toward its destination after a configurable delay.

27 Claims, 6 Drawing Sheets

U.S. PATENT DOCUMENTS

| | | |
|---|---|---|
| 2004/0064582 A1* | 4/2004 | Raghunath et al. ............ 709/240 |
| 2005/0078660 A1* | 4/2005 | Wood ............................ 370/352 |
| 2005/0105469 A1* | 5/2005 | Hao ............................... 370/235 |
| 2005/0114541 A1* | 5/2005 | Ghetie et al. .................. 709/232 |
| 2005/0213504 A1* | 9/2005 | Enomoto et al. .............. 370/235 |
| 2006/0045100 A1* | 3/2006 | Klausberger et al. ......... 370/400 |
| 2006/0101153 A1* | 5/2006 | Boucher et al. ................ 709/232 |
| 2006/0101159 A1* | 5/2006 | Yeh et al. ....................... 709/246 |
| 2006/0187836 A1* | 8/2006 | Frey et al. ...................... 370/235 |
| 2006/0193256 A1 | 8/2006 | Burns et al. |
| 2007/0008884 A1* | 1/2007 | Tang .............................. 370/230 |
| 2008/0112318 A1* | 5/2008 | Groleau et al. ............. 370/230.1 |

* cited by examiner

DYNAMIC RESPONSE TO TRAFFIC BURSTS IN A COMPUTER NETWORK

TECHNICAL FIELD

The present disclosure relates generally to computer networks, and, more particularly, to dynamic network responses to traffic bursts caused by applications.

BACKGROUND

Computer networks allow communication between nodes of the network, such as a direct path between two nodes (e.g., point-to-point, P2P) or a tree-like path ("tree") between one node and multiple nodes (e.g., point-to-multipoint, P2 MP, or multipoint-to-point, MP2P). For example, "leaves" of the tree (e.g., end users) may be configured to receive transmitted signals from a single source, such as a television station transmitting broadcast data streams to receivers diversely located throughout the network (e.g., millions of leaves) in a P2 MP manner. Generally, networks are well suited for P2 MP traffic, due to the fact that the traffic may be "multicast", where each single packet of the traffic sent from the source is duplicated at diverge points of the P2 MP tree. Accordingly, each branch of the P2 MP tree usually only carries one instance of the single packet on its way to the millions of leaves/end users; that is, millions of branches each carry a single duplicated copy of the packet to the millions of end users.

Conversely, more and more applications are beginning to create MP2P situations that are far reaching throughout the network. For example, television broadcasting may include Internet Protocol (IP)-based traffic (e.g., feedback) sent from the end users to the television broadcasting station. For instance, various games, online quizzes, voting, etc., may request or result in a quick response from end users from across a country or the entire world. Often, these responses come in traffic "bursts" in the network, where very large amounts of traffic (e.g., particularly in terms of number of packets) are sent during a substantially narrow time frame. (Similarly, disaster situations may also result in such bursts of traffic, although generally on a smaller, more centralized scale, e.g., close to the disaster area, as will be understood by those skilled in the art.)

Contrary to the traffic duplication described above for P2 MP, however, the MP2P traffic generally comprises distinct packets from individual sources. In this manner, the branches close to the destination of the MP2P tree structure are required to carry all the packets sent from all of the end stations (e.g., millions), as opposed to the single duplicated packet as in P2 MP transmission. In such large scale MP2P network configurations, e.g., millions of leaves transmitting data to a single destination, buffers operating at nodes along the MP2P tree may become significantly overrun (exceeded), particularly as the "merging" traffic gets closer to the single destination. Accordingly, the occurrence of traffic bursts in MP2P networks places a substantial strain/burden on the network infrastructure.

Various solutions that have been proposed to address this problem have primarily focused on application layer response. For instance, in the event of a burst in response to a particular broadcasted data stream, an application server (e.g., at the broadcast station) may re-broadcast the data stream with embedded information that instructs the receiving end stations to apply a delay prior to responding to the data stream (for example, through configuration of a Broadband Markup Language, "BML", as will be understood by those skilled in the art). One problem associated with such an application layer response, however, is that the re-broadcast of the traffic occurs after the burst has already happened, and is thus a correction to the burst, not a prevention.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a node receives traffic sent from one or more sources towards one or more destinations (e.g., Multipoint-to-Point, MP2P traffic). The node may detect a burst of received traffic based on one or more characteristics of the burst traffic, and, in response, may dynamically apply traffic shaping to the burst traffic. The traffic shaping is adapted to forward burst traffic received below a configurable threshold at a configurable pace and to drop burst traffic received above the configurable threshold. In addition, the node may also store the burst traffic dropped by traffic shaping, and forwards the stored burst traffic towards its destination after a configurable delay.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
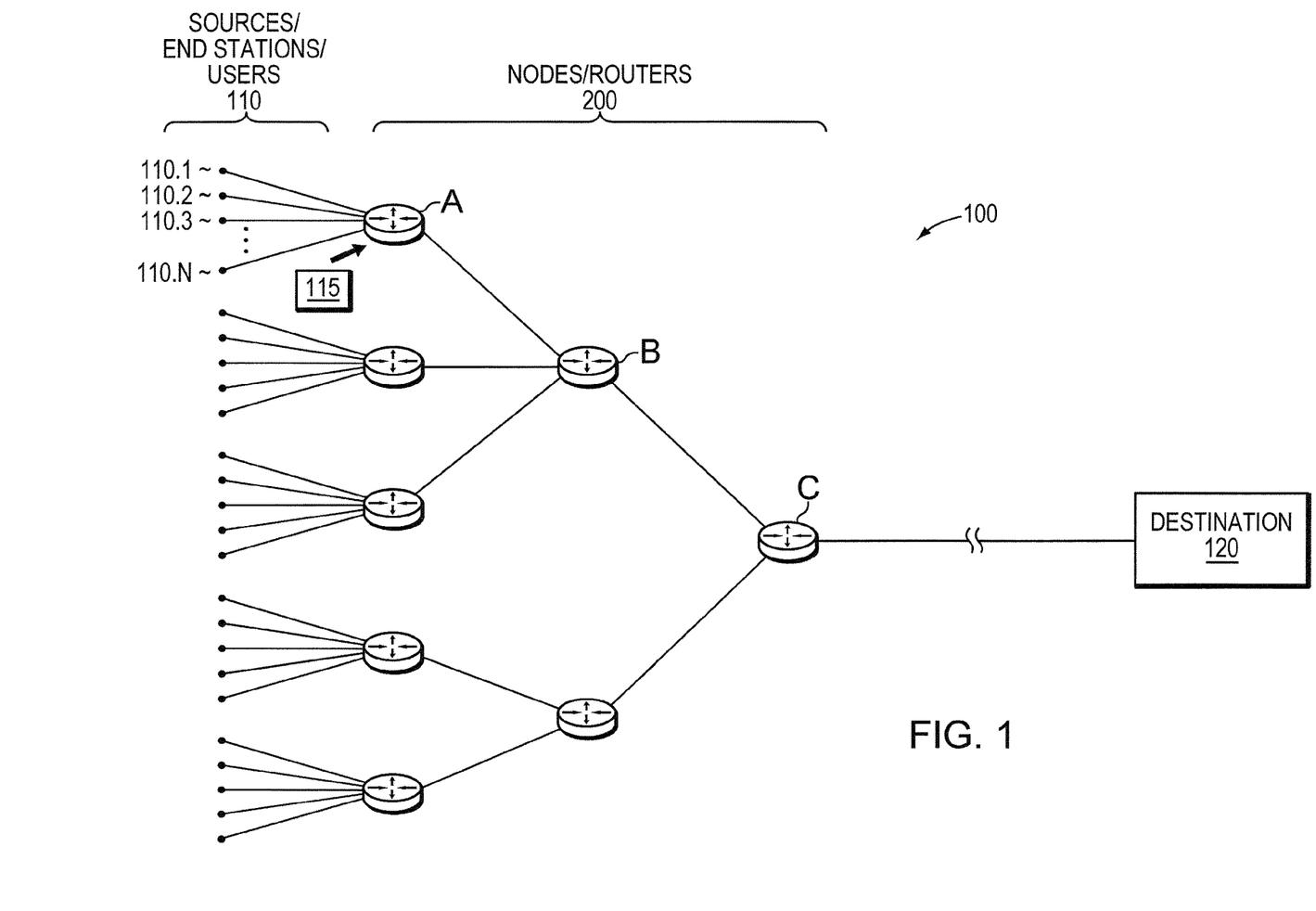
FIG. 1 illustrates an example computer network.

FIG. 1 is a schematic block diagram of an example computer network 100 illustratively comprising nodes/devices, such as one or more end stations (or end users) 110 interconnected to a destination 120 by routers 200 and links as shown. Illustratively, as described herein, the multiple end stations 110 and single destination 120 form a point-to-multipoint (P2MP) tree for traffic sent from the destination, but more particularly, form a multipoint-to-point (MP2P) tree for traffic sent from the end stations to the destination. Those skilled in the art will understand that any number of nodes, devices, links, etc. may be used in the computer network, and that the view shown herein is for simplicity. For example, while the network 100 as shown contains a given number of nodes, each router 200 connected to end stations 110 may be connected to thousands or tens of thousands of end stations. Also, the "depth" of the MP2P tree may contain more (or less) routers 200 between the end stations 110 and destination 120, e.g., ten routers 200 between a particular end station and the destination. Those skilled in the art will also understand that while the embodiments described herein is described generally, it may apply to any network configuration within an Autonomous System (AS) or area, or throughout multiple ASes or areas, etc.

Data packets/traffic 115 (e.g., traffic sent between the client and server) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
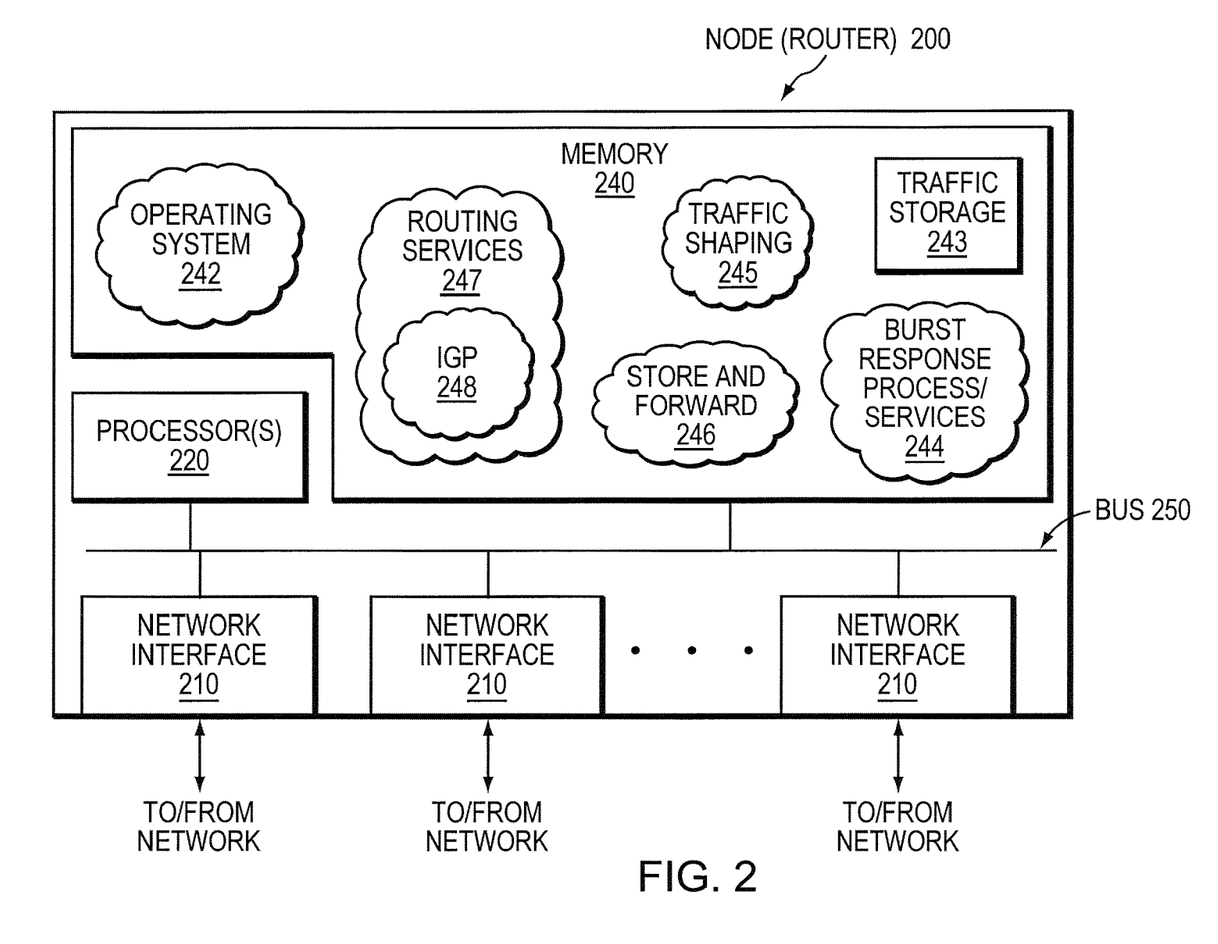
FIG. 2 illustrates an example network device/node.

FIG. 2 is a schematic block diagram of an example node/device 200 that may be advantageously used with one or more embodiments described herein, e.g., as a router. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as traffic storage 243. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247, traffic shaping process 245, store and forward process 246, and burst response process 244. It will be apparent to those skilled in the art that other processor and memory means, including various computer-readable media, may be used to store and execute program instructions pertaining to the inventive technique described herein.

Routing services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services 248, the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services 248, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
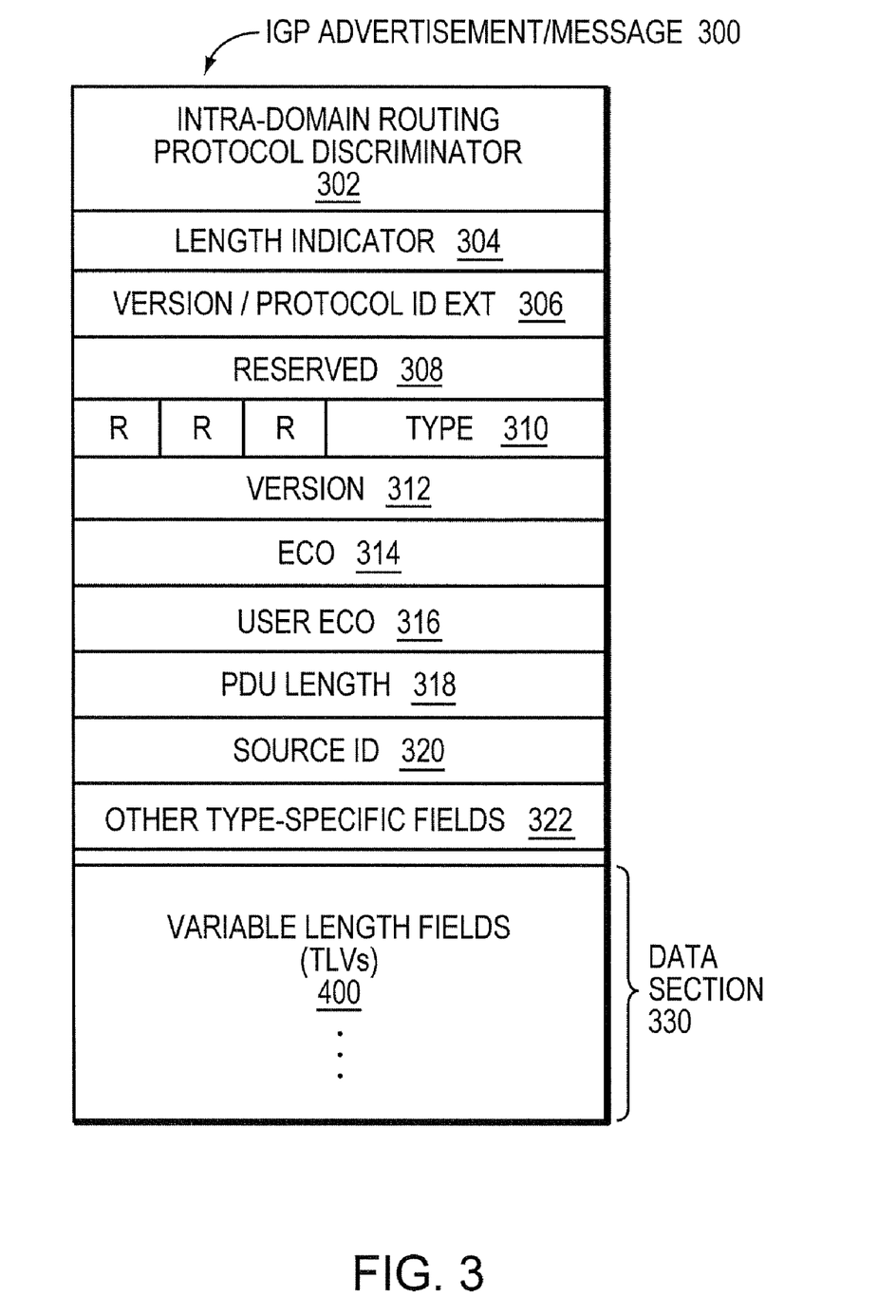
FIG. 3 illustrates an example IGP message.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

Figure 4:
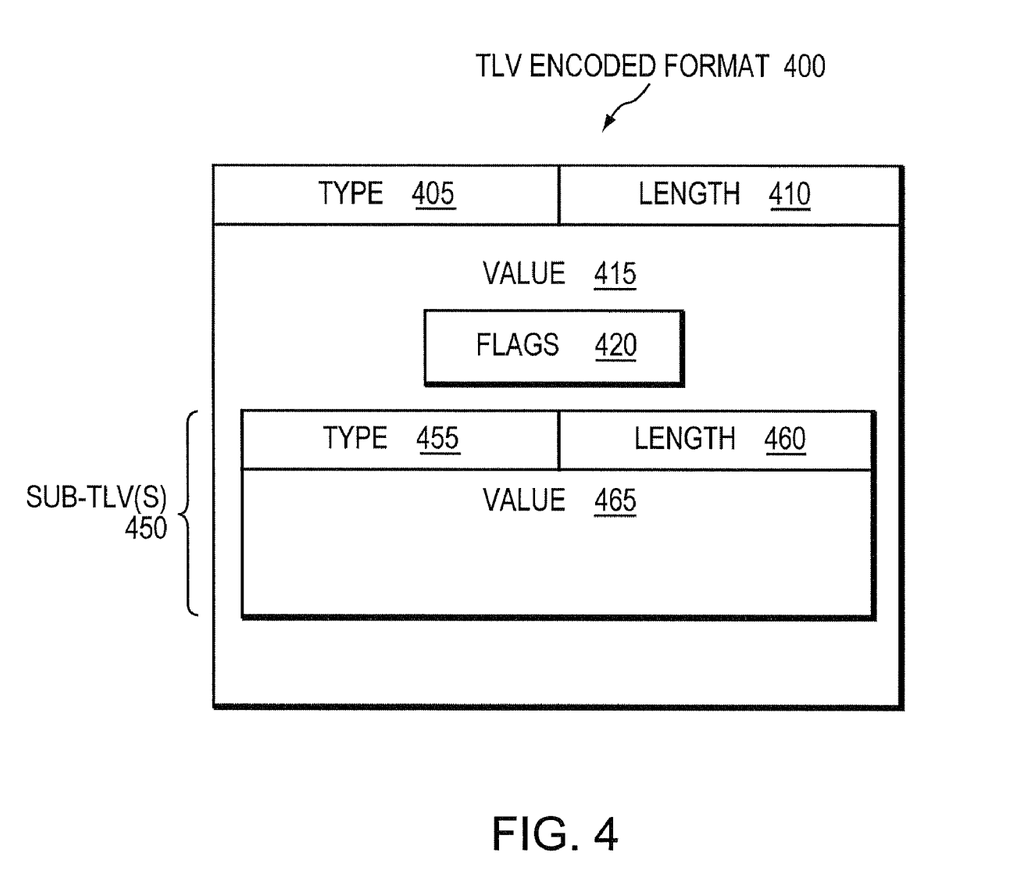
FIG. 4 illustrates an example TLV format.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel fields described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Traffic shaping process/services 245 contain computer executable instructions executed by each processor 220 to perform functions relating to "shaping" traffic patterns, as will be understood by those skilled in the art. For example, a conventional "leaky bucket" mechanism may be used to act as a queue/buffer to incoming traffic. Specifically, the leaky bucket shapes traffic by allowing traffic to leave the queue at a configured rate, such that any traffic received above the rate fills the queue (the bucket), which empties as the rate of traffic received slows over time. Those skilled in the art will appreciate that traffic shaping in this manner advantageously buffers small traffic bursts into a manageable output rate, e.g., where the size of the bucket governs the burst size that can be handled. However, once received traffic in the queue reaches a configurable threshold (that is, for illustration, the bucket fills faster than the leak can empty until the bucket is full), traffic (packets) may be dropped by the traffic shaping process 245 (or marked, etc.) due to the queue/buffer exceeding its limit and becoming overrun.

As noted above, traffic bursts may occur in the network 100, where very large amounts of traffic are sent during a substantially narrow time frame (e.g., massive bursts of small packets 115). In particular, for MP2P traffic, buffers operating at nodes along the MP2P tree may become significantly overrun (exceeded), particularly as the "merging" traffic gets closer to the single destination. As will be understood by those skilled in the art, traditional traffic shaping is generally not designed for such a substantial burst of traffic (e.g., hence the buffer overruns). Also as mentioned, the overrun traffic is typically dropped through traffic shaping, either lost completely or retransmitted by the source, adding further to the burst of traffic. A need thus exists for preventing such bursts from congesting and overburdening the network 100.

Response to (Massive) Traffic Bursts

According to embodiments of the disclosure, a node receives traffic sent from one or more sources toward one or more destinations (e.g., MP2P traffic). The node may detect a burst of received traffic based on one or more characteristics of the burst traffic, and, in response, may dynamically apply traffic shaping to the burst traffic. The traffic shaping is adapted to forward burst traffic received below a configurable threshold at a configurable pace and to drop burst traffic received above the configurable threshold. In addition, the node may also store the burst traffic dropped by traffic shaping, and forwards the stored burst traffic toward its destination after a configurable delay.

In an illustrative embodiment, burst response process 244 contains computer executable instructions executed by each processor 220 to perform functions relating to detection of and response to bursts of traffic, as described herein.

Operationally, detection of a burst of traffic may occur at any node (e.g., router 200) along the path of the burst traffic between the end station(s) 110 and destination 120, such as routers A, B, or C for traffic from end stations 110.1-110.*n* as shown. Illustratively, the burst response techniques described herein may be beneficially activated on nodes (routers) as close to the end station as possible (e.g., based on a number of hops), e.g., router A, such that the burst of traffic need not traverse the network unnecessarily. Each router 200 within the network may still be configured to detect bursts, however, since in many network topologies (e.g., particularly MP2P), downstream routers may act as merge points to multiple other routers, and thus may still experience a burst of traffic, even where each upstream router has paced the burst traffic (as described herein).

To detect a burst of traffic, burst response process 244 of a node 200 monitors the traffic received on one of its interfaces 210, e.g., associated with one or more application flows. Example application flows (types of traffic) may correspond to various games, quizzes, voting, shopping, stock trading, first winners (e.g., first user to respond), lottery, etc. Also, each application flow may correspond to a particular type of traffic, e.g., traffic on a particular port (e.g., UDP or TCP ports), traffic on a particular application flow, traffic on a particular topology of Multi-Topology Routing (MTR), etc. As an example, a particular game may operate on a particular TCP port. As such, by monitoring that particular TCP port, the node may monitor that particular game for a burst of traffic. In this manner, per-application (or per-traffic-type) burst monitoring may be achieved. Notably, however, the embodiments described herein may also apply simply to burst detection of traffic generally.

Figure 5:
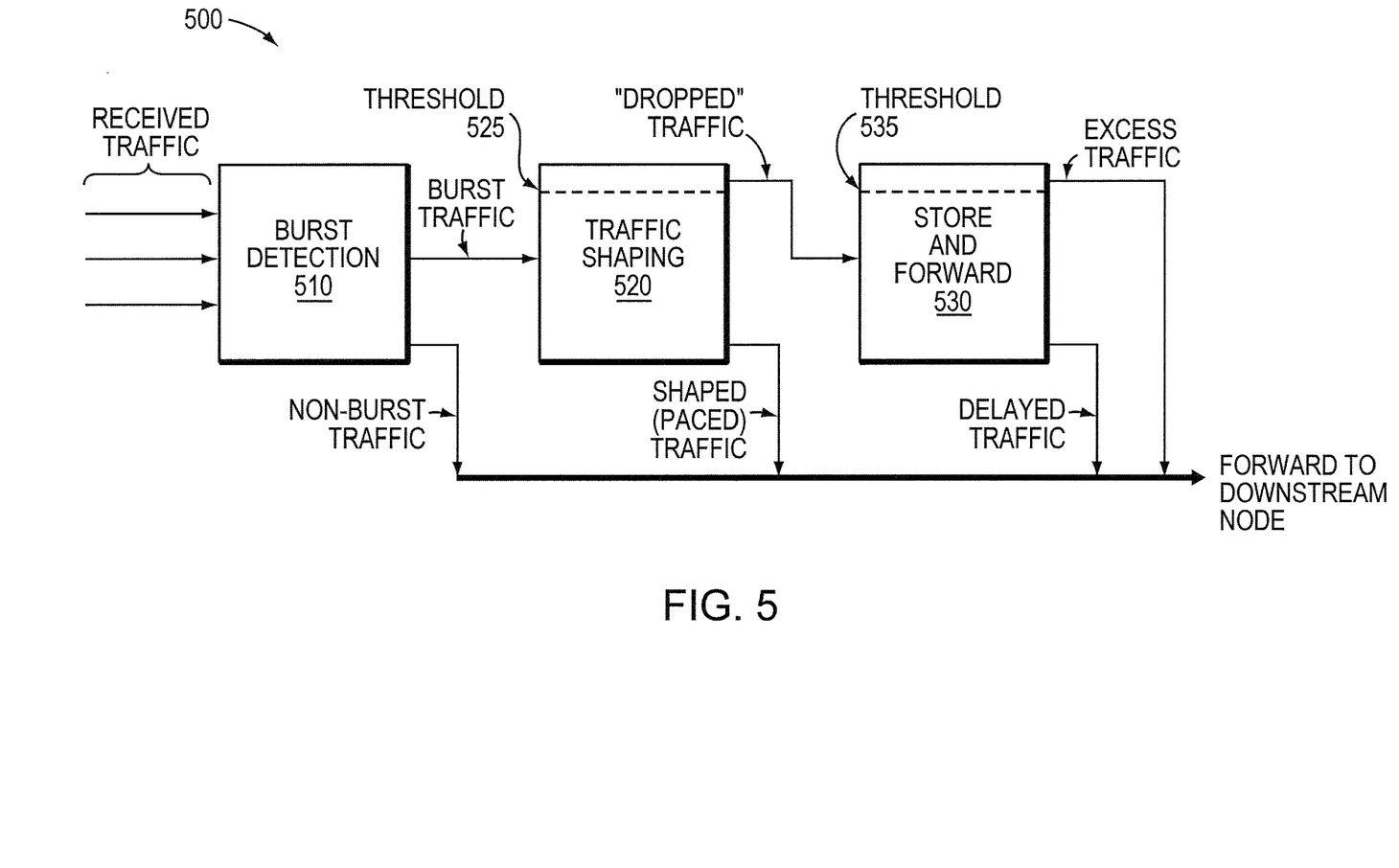
FIG. 5 illustrates an example functional block diagram of an illustrative response by a node to traffic bursts in accordance with one or more embodiments described herein.

In addition, each type of traffic may have its own set of one or more characteristic that defines boundaries (thresholds) that trigger detection of a burst of traffic for that type of traffic. (Alternatively, all traffic generally may share a set of characteristics, but each type of traffic may still be monitored and treated separately.) For example, characteristics may be used to define a rate of traffic, an amount of traffic, an amount of resources required by the traffic, a rate of increase of the rate of traffic, a rate of increase of the amount of traffic, a rate of increase of the amount of resources required by the traffic, etc. Also, combinations of one or more characteristics may be defined, e.g., an increase of 10% in the rate of traffic in the event the traffic is already above 5 megabits per second (Mbps), etc. Accordingly, should the one or more characteristics be surpassed for a particular type of traffic (e.g., and/or a particular application flow), a burst of traffic may be detected. For instance, FIG. 5 illustrates an example functional block diagram 500 of an illustrative response by a node to traffic bursts in accordance with one or more embodiments described herein, e.g., where burst detection occurs at burst detection block 510. As an example, if a particular type of traffic (e.g., a particular UDP port) has averaged 2,000 packets per second (pps), and quickly (e.g., within a matter of seconds) jumps to 10,000 pps, a burst of traffic may be so detected (assuming the thresholds are so configured).

In response to detecting a burst of traffic, the node 200 (e.g., router A) may begin to shape the burst traffic, such as with traffic shaping process 245 described above (shown in FIG. 5 as block 520). Notably, in accordance with one or more embodiments described herein, traffic that is not associated with the burst of traffic may continue to be forwarded without traffic shaping. For instance, such "non-burst traffic" may not correspond to the one or more characteristics of the burst traffic above (e.g., conventional network traffic not associated with the one or more applications causing the burst), and thus need not (though may) be handled with the burst traffic.

Accordingly, as burst traffic (packets 115) is received at the node, the traffic shaping paces the transmission of the traffic towards the next downstream node (e.g., router B). In other words, received traffic may be queued/buffered, and forwarded to a next downstream node at a controlled (shaped) pace. For example, the pace may be configured based on topology and/or abilities of the network 100, or based on the physical limitations of the node 200, etc. If the burst of traffic accumulates to an amount larger than a capacity of the queues/buffers, the shaped traffic may reach a configurable threshold 525, e.g., near or at a maximum queue/buffer length of the traffic shaping process 245 (520). Any traffic received while the traffic shaping threshold 525 is surpassed may be "dropped" by traffic shaping 520, and in accordance with one or more embodiments described herein, may be "picked up" by store and forward process 246 (530). Note that while a common use of the term "drop" implies that the traffic is discarded and irretrievable, as used herein the term "drop" may imply that traffic shaping process 245 of the device does not to forward the traffic, and that the non-forwarded traffic is stored for use by store and forward process 246 as described below.

In particular, store and forward process/services 246 (530) contain computer executable instructions executed by each processor 220 to perform functions relating to the storage and forwarding of traffic (packets 115). Illustratively, as packets are dropped by traffic shaping, store and forward process 246 (530) captures the packets, and stores them in traffic storage 243 (e.g., portion of memory 240 configured as non-volatile random access memory, NVRAM, or disks, etc.). In this manner, "dropped" traffic is not actually dropped in a traditional sense, but is stored at the node for later transmission. For instance, as a packet is stored, a delay may be applied to the packet, such that upon expiration of that delay, the node (e.g., router A) may forward the packet toward the destination 120 to the downstream neighbor (e.g., router B). Example delays may be configured from a few milliseconds (e.g., 100 ms) to a few seconds (e.g., 5 s) (other delays, longer or shorter, are also possible). Notably, by shaping the burst traffic and delaying transmission of burst traffic greater than a configurable capacity of the traffic shaping, the burst of traffic may be efficiently and effectively "spread out" over time, particularly in a substantially loss-less manner (i.e., with little or no dropped traffic). Also, the dynamic response (detection) of the burst advantageously maintains conventional traffic forwarding until such a burst response is deemed necessary.

Under various circumstances, it may be necessary/beneficial to adjust certain features of the traffic when applying delays as described above. For instance, a timestamp (e.g., based on the Network Time Protocol, NTP) may be applied to packets 115 as they are stored. Also, as will be understood by those skilled in the art, tuning may be required for UDP and TCP timers in order to preserve corresponding transmission timers that may be affected by the delayed transmission from the store and forward.

In accordance with one or more embodiments described herein, it may be also be beneficial to provide a mechanism to allow the node (e.g., router A) to release stored traffic after a configurable threshold 535 of stored traffic is surpassed, possibly indicative of reaching a resource limitation of the node (e.g., limited storage capacity, etc.). Such a release may be substantially immediate, since the concern is generally that no more traffic may be stored. Alternatively (or without such a release feature), the traffic that can not be stored may be dropped by the node, possibly resulting in unfavorable conditions as described above.

In addition, the node (e.g., router A) may be configured to request permission from the downstream node (e.g., router B) prior to forwarding the stored burst traffic above the configurable threshold. The downstream node may then either permit (grant permission) or deny (refuse permission) the request. If permission is granted, then the excess stored data may be forwarded to the downstream node. If denied, however, the node may be configured to drop the stored burst traffic above the configurable threshold. (Notably, the downstream node may first permit the forwarding of excess traffic, then later deny the forwarding, e.g., after the downstream node can no longer handle the amount of forwarded traffic, thus providing a flow control mechanism accordingly.)

Illustratively, the requests and replies between the node and a downstream node may utilize any type of communication protocol, such as IGP messages 300. For example, IGP "hello" messages may be exchanged on a regular basis between the node and the downstream node. As such, a new TLV 400 may be included within the messages to send requests and/or replies accordingly. For instance, a new TLV 400 may be configured with one or more flags 420 that may be used to indicate a request, a permission grant, a permission denial, etc. Also, as IGP messages 300, the permission and/or denial from the downstream node may be a state of the node, such that no request is necessary (e.g., simply advertising from the downstream node whether forwarding of excess burst traffic is currently allowed). In addition to IGP messages, other exchange protocols may be used, such as Bi-directional Forwarding Detection (BFD) messages, etc., as will be appreciated by those skilled in the art.

Specific permissions may also be requested in accordance with one or more embodiments described herein. For instance, the request and/or reply (e.g., as a TLV 400 and corresponding sub-TLVs 450) may include specific constraints/criteria on the excess burst traffic, such as a rate of traffic, an amount of traffic, a type of application to which the traffic applies, the one or more characteristics of the burst traffic, a duration of forwarding stored burst traffic, etc. In this manner, the downstream node may more specifically permit/deny excess traffic, e.g., allowing only a certain amount of excess traffic, or allowing it only for a specific length of time, etc.

Further, as mentioned above, each router along the path of the burst traffic may perform the techniques described herein. Accordingly, the downstream node (e.g., router B) receiving the excess traffic (e.g., alone or in addition to paced burst traffic from multiple upstream nodes, etc.) may treat the excess traffic as a burst, and perform dynamic traffic shaping with store and forward capabilities in a similar manner. As such, the downstream node may also reach a threshold of stored (excess) traffic, and may wish to forward the excess to a subsequent downstream node. This may continue all the way to the destination, but in certain configurations, however, the number of downstream nodes that may receive stored burst traffic (excess traffic) may be limited (e.g., the third router in the chain, e.g., router C, is configured to drop excess traffic). This configuration may be statically configured on particular routers in the network 100, or may be dynamically carried in the request messages (e.g., in TLV 400), such that each router in the chain increments or decrements a count, and upon reaching the limit, the corresponding router determines that it is to drop excess traffic. Note that once a downstream router begins to drop excess traffic, it may inform the upstream router (e.g., the router requesting permission) that it may no longer send excess traffic. This denial of permission may also travel upstream all the way to the first router in the chain (e.g., router A), so any traffic that will get dropped eventually within the network 100 gets dropped near the ingress.

Figure 6:
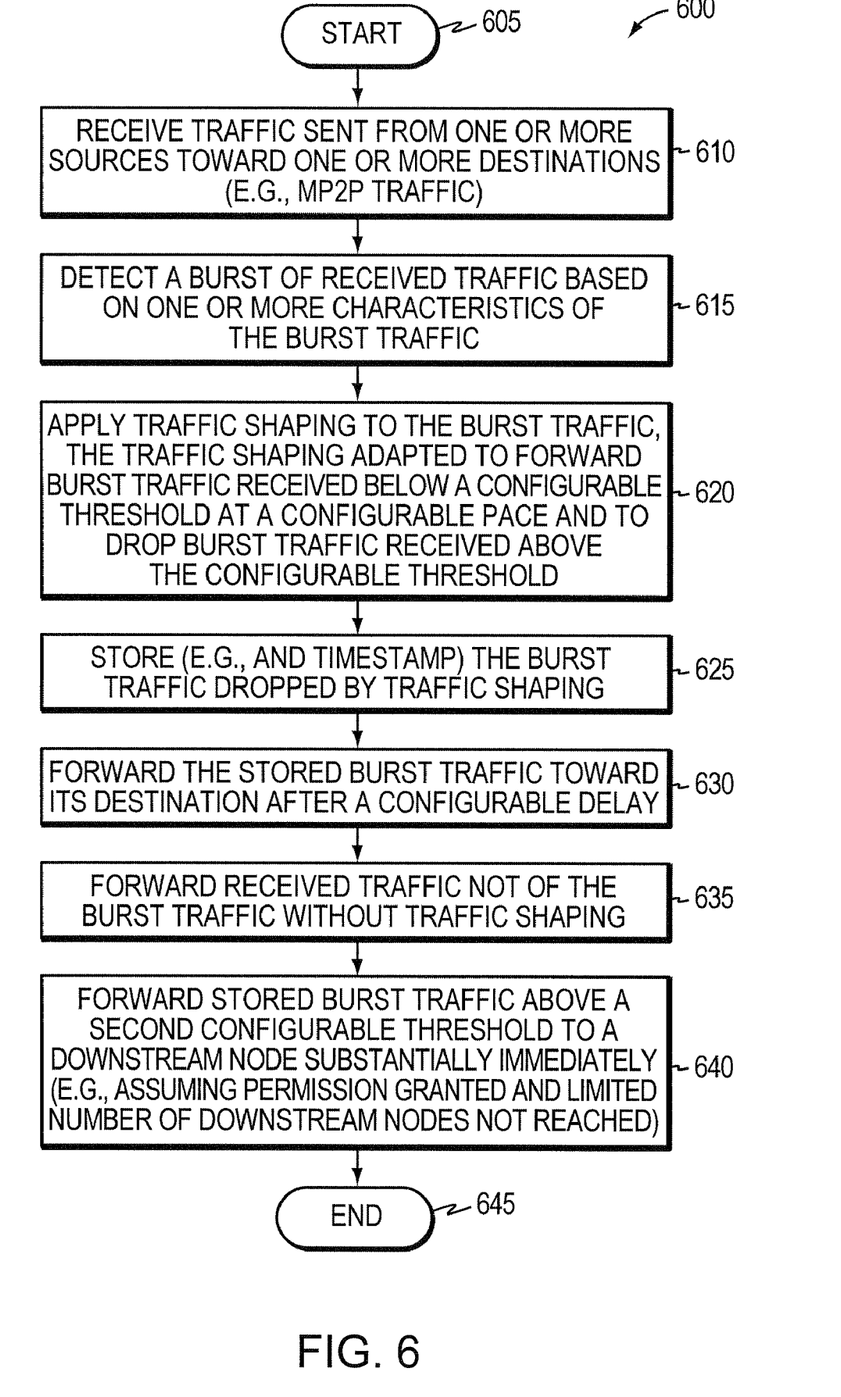
FIG. 6 illustrates an example procedure for responding to traffic bursts in accordance with one or more embodiments described herein.

FIG. 6 illustrates an example procedure for responding to bursts in accordance with one or more embodiments described herein. The procedure 600 starts at step 605, and continues to step 610, where a node (e.g., router A) receives traffic 115 sent from one or more sources (e.g., end stations 110) toward one or more destinations 120 (e.g., MP2P traffic). In step 615, the node may detect a burst (e.g., burst detection 510) of received traffic based on one or more characteristics of the burst traffic, as described above, and may apply traffic shaping (245/520) to the burst traffic in response in step 620, the traffic shaping adapted to forward burst traffic received below a configurable threshold 525 at a configurable pace and to "drop" burst traffic received above the configurable threshold. In step 625, the node stores (e.g., and timestamps) the burst traffic "dropped" by traffic shaping, and forwards the stored burst traffic in step 630 toward its destination after a configurable delay (e.g., with store and forward process 246/530).

Any received traffic at the node not of the burst traffic (non-burst traffic) may be forwarded by the node in step 635 without traffic shaping. Further, as mentioned above, the node may be configured to forward stored burst traffic above a second configurable threshold 535 to a downstream node substantially immediately upon surpassing the threshold in step 640. For instance, step 640 may occur assuming permission has been granted, and the limited number of downstream nodes has not reached, as noted above. The procedure 600 ends in step 645, notably continuing each step above for received burst traffic and non-burst traffic as described herein.

Advantageously, the novel techniques described herein respond to traffic bursts in a computer network, particularly for MP2P traffic bursts. By providing dynamically activated selective traffic shaping with store and forward capabilities as described above, the novel techniques reduce traffic bursts in the computer network in an effective and efficient manner. In particular, the techniques described above avoid retransmission of the burst traffic and also avoid packet drops for real-time applications. Further, the dynamic aspects of one or more embodiments described herein alleviate the need for cumbersome and inefficient manual response and/or configuration.

While there have been shown and described illustrative embodiments that respond to traffic bursts in a computer network, it is to be understood that various other adaptations and modifications may be made within the spirit and scope of the present invention. For example, the embodiments shown and described herein refer primarily to MP2P networks and corresponding traffic patterns. However, the embodiments of the invention in their broader sense are not so limited, and may, in fact, be used with any type of data transmission (e.g., P2P, P2 MP) that may experience traffic bursts. Also, while the above description mentions various example communication protocols (e.g., IGP, hello messages, TLVs, etc.), these protocols are meant to be illustrative examples, and other protocols, messages, fields, etc., may be used in accordance with the embodiments described herein, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving, at a node, traffic sent from one or more sources toward one or more destinations;
detecting an occurrence of a burst of traffic in the received traffic ("burst traffic") based on one or more characteristics of traffic that, if surpassed by the received traffic, trigger detection of the burst traffic;
in response to the detecting, applying traffic shaping to the burst traffic, the traffic shaping to forward burst traffic received below a configurable threshold at a configurable pace and to drop burst traffic received above the configurable threshold;
storing the burst traffic dropped by the traffic shaping;
applying a second configurable threshold to the stored burst traffic;
forwarding stored burst traffic that is below the second configurable threshold toward the one or more destinations after a configurable delay; and
forwarding stored burst traffic above the second configurable threshold toward the one or more destinations without added delay.

2. The method as in claim 1, wherein the one or more sources are a plurality of sources and the one or more destinations are a single destination along a multipoint-to-point (MP2P) tree.

3. The method as in claim 1, further comprising:
forwarding received traffic not of the burst traffic without traffic shaping.

4. The method as in claim 1, wherein the node is closer to the sources than to the destinations based on a number of hops.

5. The method as in claim 1, wherein the step of forwarding the stored burst traffic that is below the second configurable threshold toward the one or more destinations after a configurable delay further comprises:
applying a delay to the stored burst traffic as it is stored; and
forwarding the stored burst traffic toward the one or more destinations according to the delay.

6. The method as in claim 1, further comprising:
requesting permission from a downstream node prior to forwarding the stored burst traffic above the second configurable threshold to the downstream node.

7. The method as in claim 6, further comprising:
receiving denial of permission from the downstream node; and
dropping the stored burst traffic above the second configurable threshold.

8. The method as in claim 7, further comprising:
receiving permission to forward the stored burst traffic and forwarding the stored burst traffic above the second configurable threshold prior to receiving the denial of permission and dropping the stored burst traffic above the second configurable threshold.

9. The method as in claim 6, further comprising:
requesting specific permission corresponding to criteria selected from the group consisting of: a rate of traffic; an amount of traffic; a type of application; the one or more characteristics of the burst traffic; and a duration of forwarding stored burst traffic.

10. The method as in claim 1, further comprising:
limiting a number of downstream nodes to receive forwarded stored burst traffic above the second configurable threshold.

11. The method as in claim 1, wherein the traffic shaping is a leaky bucket.

12. The method as in claim 1, wherein the one or more characteristics correspond to a type of traffic.

13. The method as in claim 12, wherein the type of traffic is selected from the group consisting of: traffic on a particular port; traffic on a particular User Datagram Protocol (UDP) port; traffic on a particular Transmission Control Protocol (TCP) port; traffic on a particular application flow; and traffic on a particular topology of Multi-Topology Routing (MTR).

14. The method as in claim 13, wherein the application flows are selected from the group consisting of: games; quizzes; voting; shopping; and stock trading.

15. The method as in claim 12, wherein different characteristics are used for a plurality of different types of traffic.

16. The method as in claim 1, wherein the one or more characteristics are selected from the group consisting of: a rate of traffic; an amount of traffic; an amount of resources required by the traffic; a rate of increase of the rate of traffic; a rate of increase of the amount of traffic; and a rate of increase of the amount of resources required by the traffic.

17. A node, comprising:
one or more network interfaces configured to receive and forward traffic;
one or more processors coupled to the network interfaces and configured to execute one or more processes; and
a memory configured to store a burst response process executable by each processor, the burst response process when executed operable to: i) receive traffic sent from one or more sources toward one or more destinations; and ii) detect an occurrence of a burst of traffic in the received traffic ("burst traffic") based on one or more characteristics of traffic that, if surpassed by the received traffic, trigger detection of the burst traffic; the memory further configured to store a traffic shaping process and a store and forward process, each cooperating with the burst response process and, when executed, operable to, respectively:
iii) in response to detection of the burst traffic, apply traffic shaping to the burst traffic, the traffic shaping configured to forward burst traffic received below a configurable threshold at a configurable pace and to drop burst traffic received above the configurable threshold; iv) store the burst traffic dropped by the traffic shaping; v) apply a second configurable threshold to the stored burst traffic; vi) forward stored burst traffic that is below the second configurable threshold toward the one or more destinations after a configurable delay; and
vii) forward stored burst traffic above the second configurable threshold toward the one or more destinations without added delay.

18. An apparatus, comprising:
means for receiving traffic sent from one or more sources toward one or more destinations;
means for detecting an occurrence of a burst of traffic in the received traffic ("burst traffic") based on one or more characteristics of traffic that, if surpassed by the received traffic, trigger detection of the burst traffic;
means for applying traffic shaping to the burst traffic in response to detection of the burst traffic, the traffic shaping configured to forward burst traffic received below a configurable threshold at a configurable pace and to drop burst traffic received above the configurable threshold;
means for storing the burst traffic dropped by traffic shaping;
means for applying a second threshold to the stored burst traffic;
means for forwarding stored burst traffic that is below the second configurable threshold toward the one or more destinations after a configurable delay; and
means for forwarding stored burst traffic above the second configurable threshold toward the one or more destinations without added delay.

19. The node as in claim 17, wherein the one or more sources are a plurality of sources, and the one or more destinations are a single destination along a multipoint-to-point (MP2P) tree.

20. The node as in claim 17, wherein the traffic shaping process is further operable, when executed, to forward received traffic other than the burst traffic without any traffic shaping.

21. The node as in claim 17, wherein the store and forward process is operable, when executed, to forward the stored burst traffic that is below the second configurable threshold toward the one or more destinations after a configurable delay by application of a delay to the burst traffic as the burst traffic is stored, and to forward the stored burst traffic in response to the delay.

22. A method, comprising:
monitoring a flow of traffic received at a node from one or more sources and directed toward one or more destinations;
determining if particular traffic in the flow of traffic is part of a burst of traffic ("burst traffic"), or is not part of a burst of traffic ("non-burst traffic"), based on one or more characteristics that trigger detection of a burst of traffic;
in response to determining that the particular traffic in the flow of traffic is burst traffic,
applying traffic shaping to the burst traffic by the node, the traffic shaping to forward burst traffic received below a threshold at a configurable pace and to drop burst traffic received above the threshold,
storing, at the node, the burst traffic dropped by the traffic shaping,
forwarding stored burst traffic that is below a second threshold after a configurable delay, and
forwarding stored burst traffic that is above the second threshold without added delay;
in response to determining the particular traffic in the flow of traffic is non-burst traffic, forwarding the non-burst traffic toward the one or more destinations by the node, without applying traffic shaping by the node.

23. The method as in claim 22, further comprising:
requesting permission from a downstream node to forward the stored burst traffic; and
in response to receiving permission from the downstream node, forwarding the stored burst traffic toward the one or more destinations.

24. The method as in claim 22, wherein one or more characteristics that trigger detection of a burst of traffic include at least one of a rate of the particular traffic, an amount of particular traffic, an amount of resources required by the particular traffic, a rate of increase of the rate of particular traffic, a rate of increase of the amount of particular traffic, and a rate of increase of the amount of resources required by the particular traffic.

25. An apparatus, comprising:
one or more network interfaces configured to receive and forward traffic;
a processor coupled to the one or more network interfaces and configured to execute one or more processes; and
a memory configured to store one or more processes executable by the processor, the one or more processes operable, when executed, to
monitor a flow of traffic received on the one or more network interfaces from one or more sources and directed toward one or more destinations,
determine if particular traffic in the flow of traffic is part of a burst of traffic ("burst traffic"), or is not part of a burst of traffic ("non-burst traffic"), based on one or more characteristics that trigger detection of a burst of traffic,
in response to a determination that the particular traffic in the flow of traffic is burst traffic,
apply traffic shaping to the burst traffic, the traffic shaping to forward burst traffic received below a threshold at a configurable pace and to drop burst traffic received above the threshold,
store the burst traffic dropped by the traffic shaping,
forward stored burst traffic that is below a second threshold after a configurable delay, and
forward stored burst traffic that is above the second threshold without added delay, and
in response to a determination that the particular traffic in the flow of traffic is non-burst traffic, forward the non-burst traffic toward the one or more destinations without application of traffic shaping.

26. The apparatus as in claim 25, wherein the one or more processes are further operable, when executed, to request permission from a downstream node to forward the stored burst traffic, and in response to receipt of permission from the downstream node, forward the stored burst traffic toward the one or more destinations.

27. The apparatus as in claim 25, wherein one or more characteristics that trigger detection of a burst of traffic include at least one of a rate of the particular traffic, an amount of particular traffic, an amount of resources required by the particular traffic, a rate of increase of the rate of particular traffic, a rate of increase of the amount of particular traffic, and a rate of increase of the amount of resources required by the particular traffic.

* * * * *